United States Patent
Weilnau, Jr. et al.

(10) Patent No.: US 9,280,193 B2
(45) Date of Patent: *Mar. 8, 2016

(54) SYSTEM AND METHOD FOR EXTENDING SYSTEM UPTIME WHILE RUNNING ON BACKUP POWER

(71) Applicant: Dell Products, LP, Round Rock, TX (US)

(72) Inventors: Wayne R. Weilnau, Jr., Austin, TX (US); Elie A. Jreij, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 14/101,050

(22) Filed: Dec. 9, 2013

(65) Prior Publication Data

US 2014/0101474 A1    Apr. 10, 2014

Related U.S. Application Data

(63) Continuation of application No. 13/013,436, filed on Jan. 25, 2011, now Pat. No. 8,612,801.

(51) Int. Cl.
| | |
|---|---|
| *G06F 11/00* | (2006.01) |
| *G06F 1/30* | (2006.01) |
| *G06F 1/32* | (2006.01) |
| *G06F 11/20* | (2006.01) |

(52) U.S. Cl.
CPC .............. *G06F 1/30* (2013.01); *G06F 1/3234* (2013.01); *G06F 1/3287* (2013.01); *G06F 11/2015* (2013.01); *G06F 2201/845* (2013.01)

(58) Field of Classification Search
CPC ... G06F 1/3206; G06F 1/3212; G06F 1/3287; G06F 1/30; G06F 11/2015; G06F 2201/845
See application file for complete search history.

(56) References Cited

U.S. PATENT DOCUMENTS

| | | | |
|---|---|---|---|
| 5,532,935 A | 7/1996 | Ninomiya et al. | |
| 5,719,800 A | 2/1998 | Mittal et al. | |
| 5,781,448 A | 7/1998 | Nakamura et al. | |
| 5,838,139 A * | 11/1998 | Greene | 320/133 |

(Continued)

OTHER PUBLICATIONS

"The Benefits of Event-Driven Energy Accounting in Power-Sensitive Systems," F. Bellosa, Proceedings of the 9th Workshop on ACM SIGOPS European Workshop, 2002.

(Continued)

*Primary Examiner* — Marc Duncan
(74) *Attorney, Agent, or Firm* — Larson Newman, LLP

(57) ABSTRACT

A server chassis includes an uninterruptible power supply, and a server including a controller. The uninterruptible power supply is configured to provide a reserve power when a primary power is lost, and to send a power loss signal when the primary power is lost. The controller is configured to receive a desired server uptime, to receive an indication that a power limit for the server is fixed or decreasing over the desired server, to receive the power loss signal from the uninterruptible power supply, to send a power capacity query to the uninterruptible power supply, to receive a reserve power capacity of the uninterruptible power supply in response to the power capacity query, to calculate the power limit for the server based on the reserve power capacity of the uninterruptible power supply and on the desired server uptime, and to enforce the power limit on the server.

20 Claims, 5 Drawing Sheets

(56) References Cited

U.S. PATENT DOCUMENTS

| | | | |
|---|---|---|---|
| 6,195,754 B1 | 2/2001 | Jardine et al. | |
| 6,304,981 B1 | 10/2001 | Spears et al. | |
| 6,496,103 B1 | 12/2002 | Weiss et al. | |
| 6,591,399 B1 | 7/2003 | Wyrzykowska et al. | |
| 6,697,953 B1 * | 2/2004 | Collins | 713/320 |
| 6,721,892 B1 | 4/2004 | Osborn et al. | |
| 6,804,792 B2 | 10/2004 | Nishikawa | |
| 7,036,035 B2 | 4/2006 | Allison et al. | |
| 7,058,826 B2 | 6/2006 | Fung | |
| 7,254,016 B1 | 8/2007 | Strickland et al. | |
| 7,350,088 B2 | 3/2008 | Allison et al. | |
| 7,415,623 B2 | 8/2008 | Rapps et al. | |
| 7,418,608 B2 | 8/2008 | Kumar et al. | |
| 7,451,336 B2 | 11/2008 | Manuell et al. | |
| 7,483,992 B2 | 1/2009 | Bahl | |
| 7,493,503 B2 * | 2/2009 | Aldereguia et al. | 713/300 |
| 7,594,131 B2 | 9/2009 | Ozaki | |
| 7,607,129 B2 | 10/2009 | Rosu et al. | |
| 7,643,439 B2 | 1/2010 | Kochman et al. | |
| 7,669,071 B2 | 2/2010 | Cochran et al. | |
| 7,779,276 B2 * | 8/2010 | Bolan et al. | 713/300 |
| 7,844,839 B2 | 11/2010 | Palmer et al. | |
| 8,195,340 B1 | 6/2012 | Haney et al. | |
| 8,261,109 B2 | 9/2012 | Kim et al. | |
| 8,386,809 B2 | 2/2013 | Spitaels et al. | |
| 8,533,514 B2 * | 9/2013 | Rogers et al. | 713/340 |
| 2001/0027479 A1 | 10/2001 | Delaney et al. | |
| 2004/0073817 A1 | 4/2004 | Liu et al. | |
| 2004/0177283 A1 | 9/2004 | Madany et al. | |
| 2004/0187134 A1 | 9/2004 | Suzuki | |
| 2005/0028017 A1 | 2/2005 | Janakiraman et al. | |
| 2005/0044429 A1 | 2/2005 | Gaskins et al. | |
| 2005/0138438 A1 | 6/2005 | Bodas | |
| 2005/0229037 A1 | 10/2005 | Egan et al. | |
| 2005/0267929 A1 | 12/2005 | Kitamura | |
| 2005/0283624 A1 * | 12/2005 | Kumar et al. | 713/300 |
| 2006/0143483 A1 | 6/2006 | Liebenow | |
| 2006/0156041 A1 | 7/2006 | Zaretsky et al. | |
| 2006/0192434 A1 | 8/2006 | Vrla et al. | |
| 2006/0230299 A1 | 10/2006 | Zaretsky et al. | |
| 2007/0067657 A1 | 3/2007 | Ranganathan et al. | |
| 2007/0226539 A1 | 9/2007 | May | |
| 2007/0300083 A1 * | 12/2007 | Goodrum et al. | 713/300 |
| 2008/0114999 A1 | 5/2008 | Terry et al. | |
| 2009/0006875 A1 | 1/2009 | Varma et al. | |
| 2009/0037145 A1 | 2/2009 | Suzuki et al. | |
| 2009/0049316 A1 | 2/2009 | Khatri et al. | |
| 2009/0144566 A1 | 6/2009 | Bletsch et al. | |
| 2009/0158072 A1 | 6/2009 | Radhakrishnan | |
| 2010/0064170 A1 | 3/2010 | Gross et al. | |
| 2011/0029787 A1 * | 2/2011 | Day et al. | 713/300 |
| 2012/0054520 A1 | 3/2012 | Ben-Tsion | |
| 2012/0072745 A1 * | 3/2012 | Ahluwalia et al. | 713/320 |
| 2012/0192007 A1 | 7/2012 | Weilnau, Jr. et al. | |
| 2012/0331317 A1 | 12/2012 | Rogers et al. | |
| 2013/0007515 A1 | 1/2013 | Shaw | |
| 2013/0173946 A1 * | 7/2013 | Rotem et al. | 713/340 |

OTHER PUBLICATIONS

"vEC: Virtual Energy Counters," I. Kadayif et al., Proceedings of the ACM SIGPLAN-SIGSOFT Workshop on Program Analysis for Software Tools and Engineering, 2001.

"Runtime Identification of Microprocessor Energy Saving Opportunities," W.L. Bircher et al., Laboratory for Computer Architecture, Dept. of Electrical and Computer Engineering, The University of Texas, Aug. 2005.

"CoolThreads Selection Tool (cooltst)," R. Lane et al., Sun Microsystem's Cooltst on BigAdmin System Administration Portal at /bigadmin/content/cooltst_tool/, Apr. 2006.

* cited by examiner

SYSTEM AND METHOD FOR EXTENDING SYSTEM UPTIME WHILE RUNNING ON BACKUP POWER

CROSS REFERENCE TO RELATED APPLICATIONS

This application is a continuation of U.S. patent application Ser. No. 13/013,436, entitled "System and Method for Extending System Uptime while Running on Backup Power," filed on Jan. 25, 2011, the disclosure of which is hereby expressly incorporated by reference in its entirety.

FIELD OF THE DISCLOSURE

This disclosure generally relates to information handling systems, and more particularly relates to a system and method extending system uptime while running on backup power.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a server, can include an uninterruptible power supply (UPS) to store backup power for the server if the server loses alternating current (AC) power or Direct Current (DC) power. The length of time that the server can operate on the backup power from the UPS depends on a power storage capacity of the UPS.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
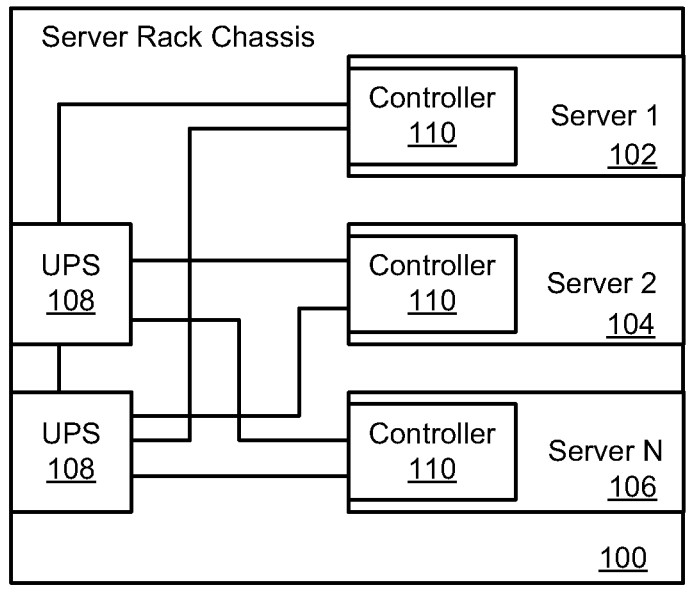
FIG. 1 is a block diagram of a server rack chassis.

FIG. 1 shows a server rack chassis 100 of information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The server rack chassis 100 includes servers 102, 104, and 106, and uninterruptible power supplies (UPSs) 108. Each of the servers 102, 104, and 106 can include a controller 110, which each are in communication with the UPSs 108. In an embodiment, both of the UPSs 108 can combine to provide backup power to the servers 102, 104, and 106. In another embodiment, one of the UPSs 108 can provide primary backup power to the servers 102, 104, and 106, and the other UPS can be a reserve UPS to provide power to the servers only if the primary UPS fails. Each of the controllers 110 can be any type of controller, such as an integrated Dell Remote Access Controller (iDRAC), which is an interface card that can provide out-of-band management between the server 102, 104, or 106 and a remote user. The controllers 110 can each have a processor, a memory, a battery, a network connection, and access to a server chassis bus. The controller 110 can provide different functions for the server 102, 104, or 106, such as power management, virtual media access, and remote console capabilities. The power management, the virtual media access, and the remote console capabilities can all be available to the remote user through a graphical user interface (GUI) on a web browser. Thus, the remote user can configure the servers 102, 104, and 106 of the server rack chassis 100, as if the remote user was at the local console.

Figure 3:
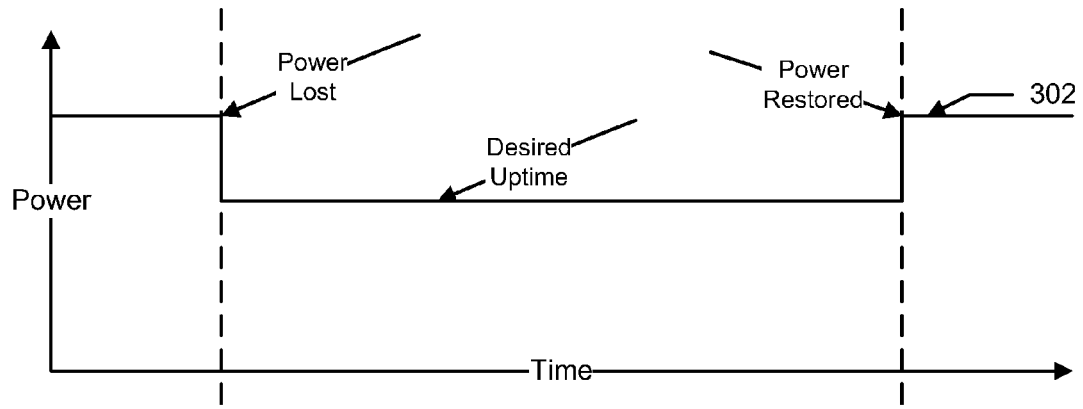
FIG. 3 is a waveform of power provided to a server.
Figure 4:
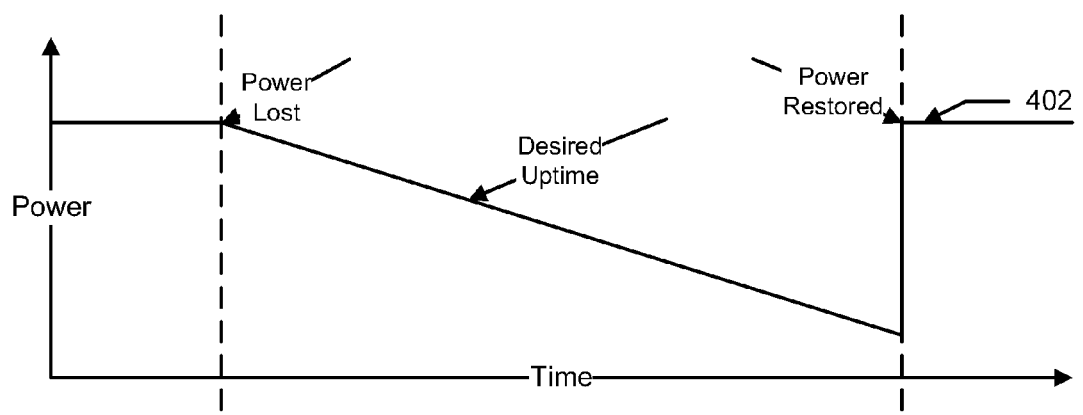
FIG. 4 is an alternate waveform of power provided to the server.

A user, either remote or local to the server rack chassis 100, can access the controller 110 of each of the servers 102, 104, and 106 via the GUI to configure power settings for the servers in situations when AC power or DC power is lost to the server rack chassis 100. For example, the user can set a desired uptime for each individual server, a percentage of power available from the UPS allocated to each server, whether a power limit or cap for the servers is fixed over the desired uptime as shown by waveform 302 of FIG. 3, whether the power limit for the servers decreases over the desired uptime as shown by waveform 402 of FIG. 4, or the like.

When the AC power is lost, the UPS 108 can send a power loss notification signal to each of the controllers 110 of the servers 102, 104, and 106. The power loss notification signal can be any type of communication signal, such as a simple network management protocol (SNMP) signal or trap, or the like. When the controller 110 receives the power loss notification signal, the controller can send a reserve power query to the UPS 108 to request a reserve power capacity of the UPS. After receiving the reserve power capacity of the UPS 108, the controller 110 can compute the power limit for the server 102 based on the reserve power capacity, on whether the power limit is fixed or decreasing, on the percentage of the reserve power capacity allocated to the server, and on desired uptime for the server. The power limit can be a maximum amount of power that the server 102 is allowed to use during a given time period.

After setting the power limit, the controller 110 can communicate with a host processor of the server 102, and cut back the host processor to enforce the power limit in the server. The host processor can then disable particular components in the server 102 so that the server can operate at the power limit determined by the controller 110. The controller 110 can dynamically adjust the power limit for the server at fixed intervals over the desired uptime for the server 102. For example, the controller 110 can poll the UPS 108 at the fixed intervals to receive a current reserve power capacity of the UPS. When the controller 110 has received the current reserve power capacity, the controller can calculate and set a new power limit for the server 102. If the current reserve power capacity of the UPS 108 is higher than expected because the servers 102, 104, and 106 did not use all of the allocated power for a given time period, the new power limit for the server 102 can higher than the original power limit. The controller 110 can continue to re-poll the UPS 108 at the fixed intervals to receive the current reserve power capacity of the UPS, and can re-calculate and set the new power limit for the server based on the current reserve power capacity until the AC power is restored to the server rack chassis 100.

In another embodiment, the controllers 110 can communicate with each other to further adjust the power limits for the servers 102, 104, and 106. For example, the controller 110 of server 102 can communicate with the controller of server 104, and determine that server 104 is operating below an expected capacity and that server 102 is operating above an expected capacity. In this situation, the controller 110 of server 102 can decrease the percentage of the current reserve power capacity of the UPS 108 allocated to server 102, and the controller of server 104 can increase the percentage of the current reserve power capacity allocated to server 104. Thus, the new power limit for the server 102 can decrease, and the new power limit for the server 104 can increase.

Figure 2:
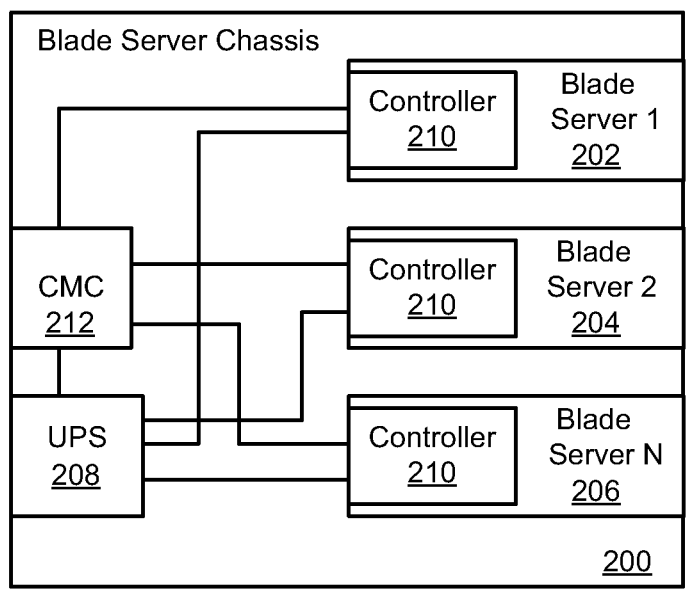
FIG. 2 is a block diagram of a blade server chassis.

FIG. 2 shows a blade server chassis 200 including servers 202, 204, and 206, an UPS 208, and a chassis management controller (CMC) 212. Each of the servers 202, 204, and 206 can include a controller 210, which each are in communication with the UPS 208 and with the CMC 212. The UPS 208 is in communication with the CMC 212.

The user can access the CMC 212 via a GUI to configure power settings for the servers 202, 204, and 206 when the AC power is lost to the blade server chassis 200. For example, the user can set in the CMC 212 a desired uptime for each of the servers 202, 204, and 206, a percentage of power available from the UPS allocated to each server, whether a power limit for the servers is fixed over the desired uptime, whether the power limit for the servers decreases over the desired uptime, or the like.

When the AC power is lost, the UPS 208 can send the power loss notification signal to the CMC 212, which in response can send the reserve power query to the UPS 208 to request the reserve power capacity of the UPS. After receiving the reserve power capacity of the UPS 208, the CMC 212 can compute the power limit for each of the servers 202, 204, and 206 based on the reserve power capacity, on whether the power limit is fixed or decreasing, on the percentage of the reserve power capacity allocated to each server, and on desired uptime for the servers.

The CMC 212 can also determine to shut down one of the servers 202, 204, and 206, to prevent any server that is not currently powered on from powering on, or the like based on the reserve power capacity of the UPS 208. If the CMC 212 determines that server 202 needs to be powered down, the CMC can send a power down signal to the controller 210 of the server 202. Similarly, if the CMC 212 determines that server 204 should not be powered on, the CMC can send a do not power on signal to or reject a power on request from the controller 210 of the server 204. The CMC 212 can send the power limit for each of the servers 202, 204, and 206 to the controller 210 of the respective server.

When the controller 210 of each of the servers 202, 204, and 206 has received the power limit for the server, the controller can enforce the power limit via the host processor of the server. For example, the controller 210 can communicate with the host processor of the server 202, and cut back the host processor to enforce the power limit in the server. The host processor can then disable particular components in the server so that the server can operate at the power limit determined by the CMC 212.

The CMC 212 can also dynamically adjust the power limit for each of the server 202, 204, and 206 over the desired uptime for the blade server chassis 200. For example, the CMC 212 can poll the UPS 208 at fixed intervals to receive the current reserve power capacity of the UPS. When the CMC 212 has received the current reserve power capacity, the controller can calculate and set the new power limit for each of the servers 202, 204, and 206. If the current reserve power capacity of the UPS 208 is higher than expected because the servers 202, 204, and 206 did not use all of the allocated power for a given time period, the new power limit for each of the servers can be higher than the original power limit. The CMC 212 can continue to re-poll the UPS 208 at the fixed intervals to receive the current reserve power capacity of the UPS, and can re-calculate and set the new power limit for each of the servers 202, 204, and 206 based on the current reserve power capacity until the AC power is restored to the blade server chassis 200.

Figure 5:
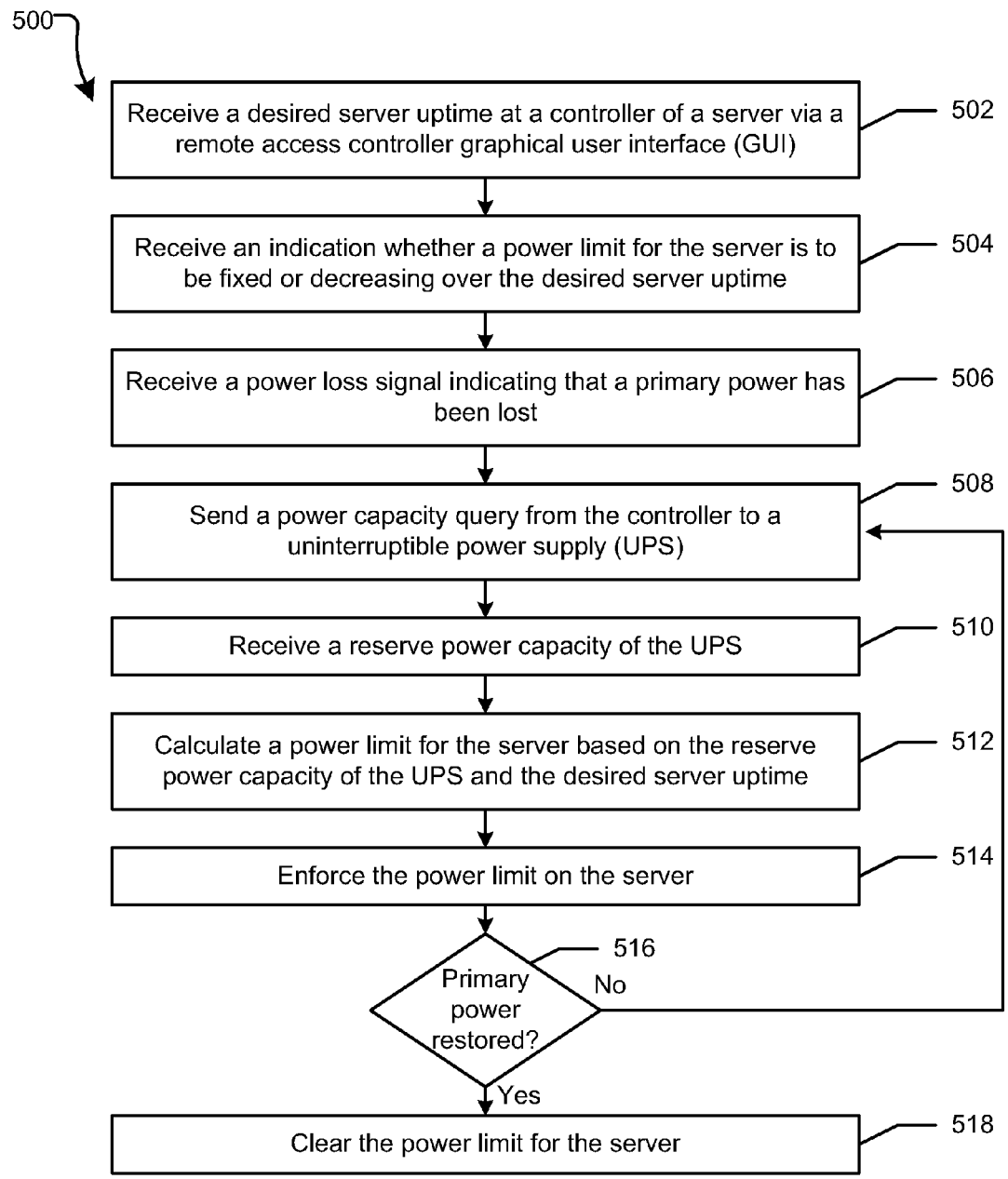
FIG. 5 is a flow diagram of a method for extending an uptime of the server running on backup power.

FIG. 5 shows a method 500 for extending an uptime of the server running on backup power. At block 502, a desired server uptime is received at a controller of a server. The desired server uptime can be received from a user via a GUI. An indication of whether a power limit for the server is to be fixed or decreasing over the desired server uptime is received at the controller at block 504. At block 506, a power loss signal is received from a UPS indicating that a primary power has been lost. The primary power can be AC power or DC power. A power capacity query is sent from the controller to the UPS at block 508.

At block 510, a reserve power capacity of the UPS is received at the controller. The power limit for the server is calculated based on the reserve power capacity of the UPS and on the desired server uptime at block 512. At block 514, the power limit of the server is enforced by the controller. The power limit can be enforced by the controller reducing the power consumption of the host processor, memory, and other components, or even shutting down unused components like redundant network adapters. At block 516, a determination is made whether the primary power has been restored. If the primary power has not been restored, the flow repeats as stated above at block 508. If the primary power has been restored, the power limit for the server is cleared at block 518.

Figure 6:
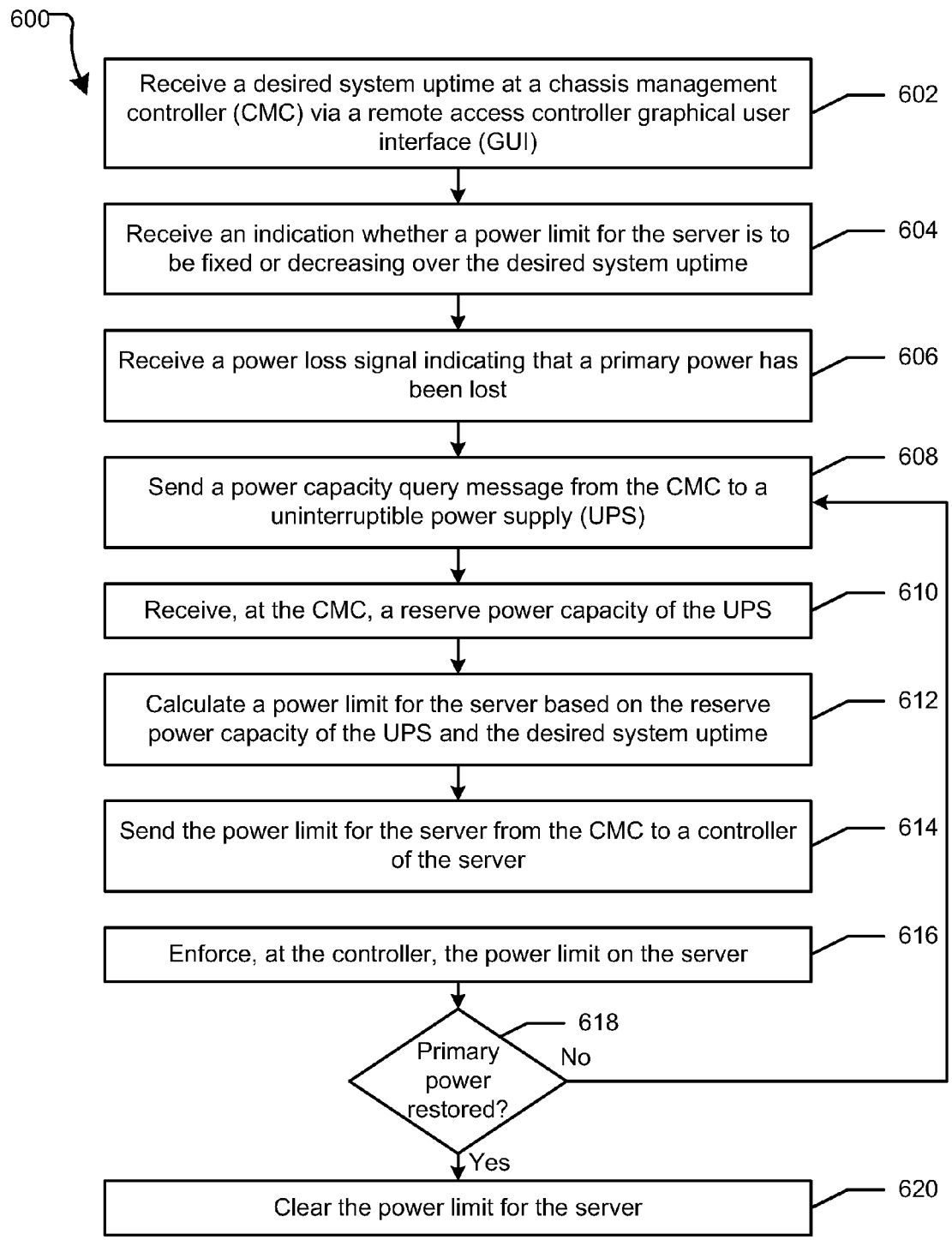
FIG. 6 is a flow diagram of an alternative method for extending the uptime of the server running on the backup power.

FIG. 6 shows an alternative method 600 for extending an uptime of the server running on backup power. At block 602, a desired system uptime is received at a CMC of a blade server chassis. The desired system uptime can be received from a user via a GUI. An indication of whether a power limit for a server is to be fixed or decreasing over the desired system uptime is received at the CMC at block 604. At block 606, a power loss signal is received at the CMC from a UPS indicating that primary power has been lost. The primary power can be AC power or DC power. A power capacity query is sent from the CMC to the UPS at block 608.

At block 610, a reserve power capacity of the UPS is received at the CMC. The power limit for the server is calculated based on the reserve power capacity of the UPS and on the desired system uptime at block 612. At block 614, the power limit for the server is sent to a controller of the server. At block 616, the power limit on the server is enforced by the controller. The power limit can be enforced by the controller by reducing the power consumption of the host processor, memory, and other components, or even shutting down unused components like redundant network adapters. At block 618, a determination is made whether the primary power has been restored. If the primary power has not been restored, the flow repeats as stated above at block 608. If the primary power has been restored, the power limit for the server is cleared at block 620.

Figure 7:
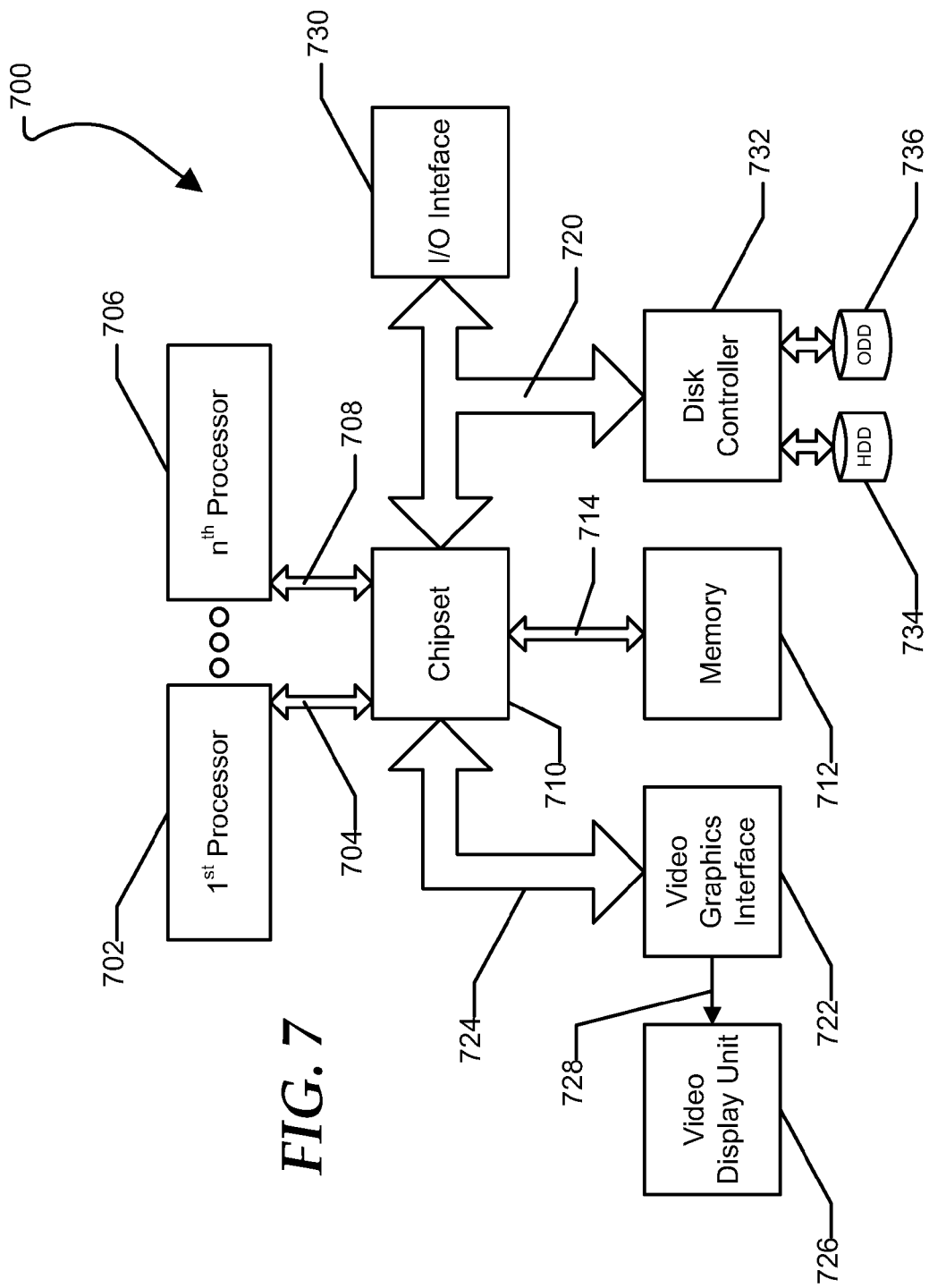
FIG. 7 is a block diagram of a general information handling system.

FIG. 7 illustrates a block diagram of a general information handling system, generally designated at 700. In one form, the information handling system 700 can be a computer system such as a server. As shown in FIG. 7, the information handling system 700 can include a first physical processor 702 coupled to a first host bus 704 and can further include additional processors generally designated as $n^{th}$ physical processor 706 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 700 during multiple processing operations.

According to one aspect, the chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

According to another aspect, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be an Accelerated Graphics Port (AGP) interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a Peripheral Component Interconnect (PCI) bus or a high speed PCI-Express bus. In one embodiment, a PCI bus can be operated at approximately 76 MHz and a PCI-Express bus can be operated at approximately 728 MHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the $n^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A server chassis comprising:
an uninterruptible power supply configured to provide a reserve power when a primary power is lost, and to send a power loss signal when the primary power is lost; and
a server including a controller in communication with the uninterruptible power supply, the controller configured to receive a desired server uptime, to receive an indication that a power limit for the server decreases over the desired server uptime prior to when the primary power is lost, to receive a reserve power capacity of the uninterruptible power supply in response to a power capacity query sent in response the power loss signal, to calculate the power limit for the server based on the reserve power capacity of the uninterruptible power supply and on the desired server uptime, and to enforce the power limit on the server.

2. The server chassis of claim 1 further comprising:
a chassis management controller in communication with the uninterruptible power supply and the controller of the server, the chassis management controller configured to calculate the power limit of the server, and to send to power limit to the controller of the server.

3. The server chassis of claim 1 wherein the controller is further configured to determining when the primary power has not been restored, to send the power capacity query from the controller to the uninterruptible power supply, to receive a current reserve power capacity of the uninterruptible power supply at the controller, to calculate a new power limit for the server based on the current reserve power capacity of the uninterruptible power supply, on a percentage of the current reserve power capacity allocated to the server, and on the desired server uptime, and to enforce the new power limit on the server.

4. The server chassis of claim 3 wherein the new power limit is enforced by the controller reducing the power consumption of the host processor, memory, and other components, or even shutting down unused components like redundant network adapters.

5. The server chassis of claim 1 wherein the controller is further configured to determining when the primary power has been restored, and to clear the power limit for the server in the controller when the primary power has been restored.

6. The server chassis of claim 1 wherein the desired server uptime is received from a user via a graphical user interface or Command Line Interface (CLI).

7. The server chassis of claim 1 wherein the power limit is enforced by the controller cutting back a host processor of the server, and the host processor shutting down difference components of the server.

8. A method comprising:
receiving a desired server uptime at a controller of a server;
receiving, at the controller, an indication that a power limit for the server is fixed or decreasing over the desired server uptime;
receiving a reserve power capacity of an uninterruptible power supply at the controller;
calculating the power limit for the server based on the reserve power capacity of the uninterruptible power supply, on a percentage of the reserve power capacity allocated to the server, and on the desired server uptime; and
enforcing the power limit on the server.

9. The method of claim 8 further comprising:
determining whether the primary power has been restored;
if the primary power has not been restored:
receiving a current reserve power capacity of the uninterruptible power supply at the controller;
calculating a new power limit for the server based on the current reserve power capacity of the uninterruptible power supply, on a percentage of the current reserve power capacity allocated to the server, and on the desired server uptime; and
enforcing the new power limit on the server.

10. The method of claim 9 further comprising:
clearing the power limit for the server in the controller when the primary power has been restored.

11. The method of claim 9 wherein the new power limit is enforced by the controller cutting back a host processor of the server, and the host processor shutting down difference components of the server.

12. The method of claim 8 wherein the desired server uptime is received from a user via a graphical user interface.

13. The method of claim 8 wherein the power limit is enforced by the controller cutting back a host processor of the server, and the host processor shutting down difference components of the server.

14. A method comprising:
receiving, at a chassis management controller of a blade server chassis, a desired system uptime;
receiving, at the chassis management controller, an indication that a power limit for a server is fixed or decreasing over the desired server uptime;
receiving, at the chassis management controller, a reserve power capacity of an uninterruptible power supply;
calculating, in the chassis management controller, the power limit for the server based on the reserve power capacity of the uninterruptible power supply, on a percentage of the reserve power capacity allocated to the server, and the desired system uptime;
sending the power limit for the server to a controller of the server; and
enforcing, at the controller, the power limit on the server.

15. The method of claim 14 further comprising:
determining whether the primary power has been restored;
if the primary power has not been restored:
receiving, in the chassis management controller, a current reserve power capacity of the uninterruptible power supply at the controller;
calculating, in the chassis management controller, a new power limit for the server based on the current reserve power capacity of the uninterruptible power supply, on a percentage of the current reserve power capacity allocated to the server, and on the desired server uptime;
sending the new power limit for the server from the chassis management controller to the controller of the server; and
enforcing, in the controller, the new power limit for the server.

16. The method of claim 15 further comprising:
clearing, in the chassis management controller, the power limit for the server in the controller when the primary power has been restored.

17. The method of claim 15 wherein the new power limit is enforced by the controller cutting back a host processor of the server, and the host processor shutting down difference components of the server.

18. The method of claim 14 wherein the desired server uptime is received from a user via a graphical user interface.

19. The method of claim 14 wherein the desired server uptime is received from a user via a command line interface.

20. The method of claim 14 wherein the power limit is enforced by the controller cutting back a host processor of the server, and the host processor shutting down difference components of the server.

* * * * *